Dec. 5, 1939.   L. H. MOOMAW   2,182,133
CAMERA
Filed Jan. 2, 1937   2 Sheets-Sheet 1

Inventor:
Lewis H. Moomaw,

Dec. 5, 1939.  L. H. MOOMAW  2,182,133
CAMERA
Filed Jan. 2, 1937   2 Sheets-Sheet 2
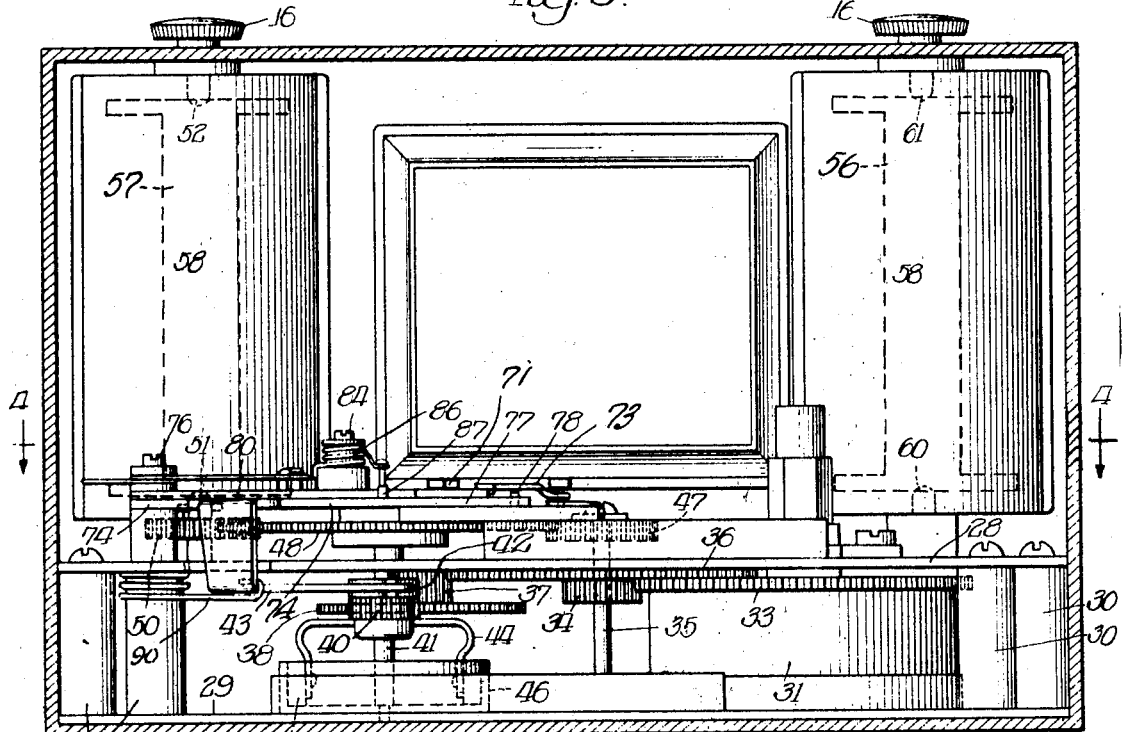
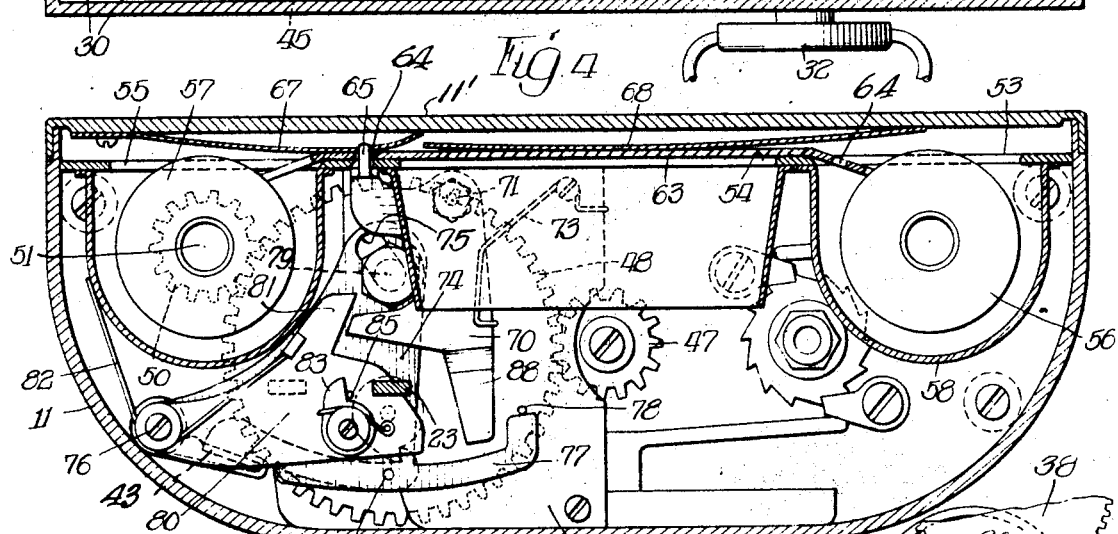
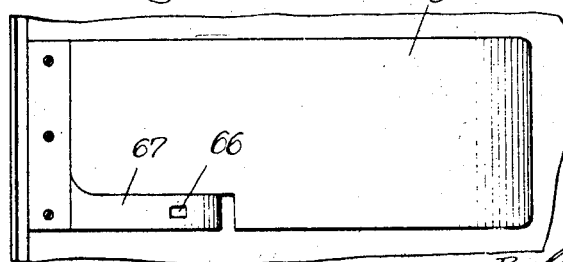
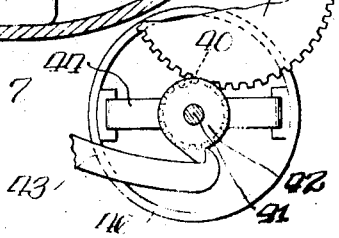
Inventor:
Lewis H. Moomaw, Patented Dec. 5, 1939

2,182,133

UNITED STATES PATENT OFFICE 2,182,133

CAMERA

Lewis H. Moomaw, Wilmette, Ill.

Application January 2, 1937, Serial No. 118,726

3 Claims. (Cl. 242—71)

The invention relates to photographic cameras and has for a primary object to provide a camera having motor operated mechanism for automatically advancing the sensitized film after operation of the shutter to thereby prevent a double exposure.

In the embodiment of the invention shown in the drawings the camera is provided with an actuating lever for tripping the shutter and which is so connected to the shutter as to accomplish this function when moved in one direction so that advantage may be taken of the return movement to withdraw a projection from an opening in the film and simultaneously release the spring motor to cause shifting of the film. Thus an unexposed portion of the film is brought into position for the next exposure, thereby preventing a double exposure and which makes possible the taking of a number of snap shots in rapid succession.

Another object of the invention is to provide improved means including plate members having novel association with each other to effect upon actuation simultaneous withdrawing of the projection and also the holding means releasing the spring motor to shift the film and which will provide a latch maintaining the holding means in released position until the projection again enters an opening in the film.

Another object is to provide a resilient backing member for the film to yieldingly hold the same against the exposure aperture and against an opening through which the projection extends to assure accuracy in aligning the opening in said film with said projection.

Another object is to provide indicating means which will visibly indicate to the operator the number of exposures taken on the particular roll of film in the camera.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

Figure 3 is an elevational view with the front portion of the housing removed showing the spring motor and gearing for shifting the film;

Figure 4 is a sectional view taken horizontally through the camera substantially along line 4—4 of Figure 3, showing the mechanism actuated by the manipulating part in position with the projection located within an opening in the film;

Figure 6 is a fragmentary elevational view showing the resilient member for maintaining the film against the aperture plate;

Figure 7 is a sectional view showing the stop member for locking the motor against operation;

Figure 1:
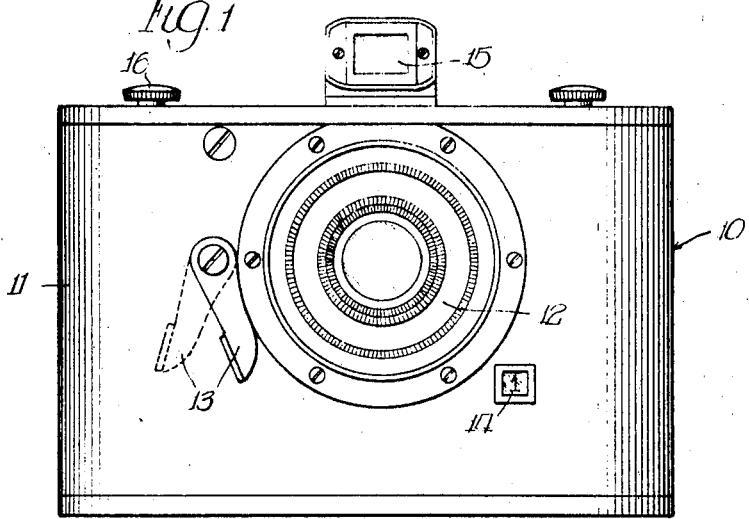
Figure 1 is a front elevational view of a camera embodying the features of the invention.
Figure 2:
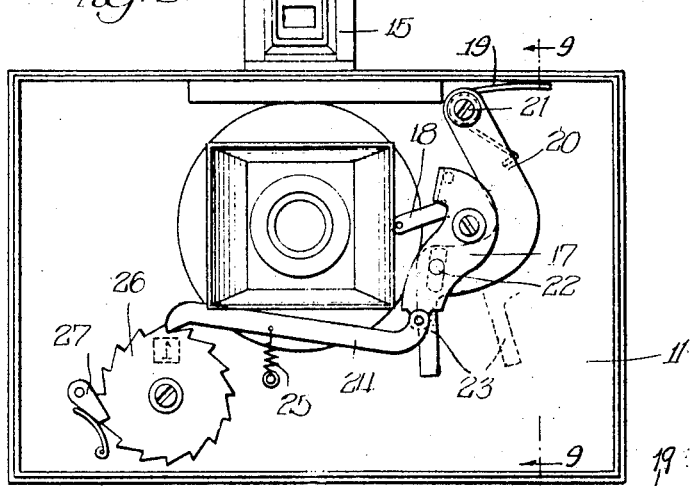
Figure 2 is an elevational view looking inside toward the front of the camera showing the member for tripping the shutter, the indicating mechanism connecting therewith, and the manipulating part for shifting the film.
Figure 9:
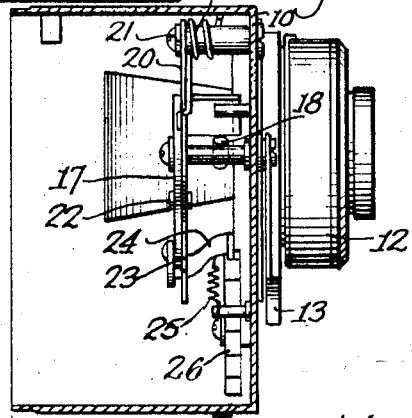
Figure 9 is a sectional view taken substantially along line 9—9 of Figure 2.

Referring to the drawings, the camera 10 selected for illustrating the present invention consists of a housing having a front portion 11 of substantially semi-cylindrical contour in section, as shown in Figure 4, and a rear cover member 11' adapted to have interfitting engagement with said front portion of the housing. The camera is equipped with the usual lens structure 12 having a shutter, not shown, and which is tripped by movement of the lever 13 from the position shown in full lines, Figure 1, to the dotted line position, as will be more particularly described. The window 14 renders visible to the operator numerical indicia indicating the number of exposures taken on the film in the camera, while the view finder 15 and knurled wheels 16 are conventional structure, the latter being manipulated by the operator when the take-up and supply spools are inserted or removed from the camera. As shown in Figure 2, the lever 13 has a counter-part in the form of a lever 17 located on the inside of portion 11, the said lever 17 having movement similar to that of lever 13. By means of the link 18 the shutter of the camera is tripped when lever 13 is moved from its full line position, Figure 1, to its dotted line position. The curved lever 20, pivoted at 21, is connected to lever 17 by pin 22 fixed to lever 17 and extending through an oblong slot formed in lever 20. Said curved lever is provided with a depending end 23, which end, on return movement, manipulates the mechanism shifting the film. The connecting levers 17 and 20 are yieldingly biased by spring 19 so that they assume the full line position, Figure 2. In this position the link 18 of the shutter mechanism maintains the shutter closed.

Pivotally secured to the depending end of lever 17 is the link 24 held in contact by spring 25 with the ratchet wheel 26. Oscillation of lever 17 will produce rotation of the ratchet wheel 26 to locate opposite window 14 numerical indicia indicating the number of exposures taken. The spring pressed dog 27 prevents rotation of the ratchet wheel in a reverse direction.

Referring more particularly to Figures 3 and 4, the portion 11 of the housing encloses mechanism driven by the spring motor for shifting the film. Said mechanism is substantially confined between frame members 28 and 29 retained in spaced relation by studs 30. The spring motor is located within a circular drum 31 and is wound by means of a handle 32. Formed on the exterior of the drum 31 is a gear 33 having meshing engagement with a pinion 34 fixed to shaft 35 which also carries gear 36. This latter gear meshes with pinion 37 carrying gear 38 having engagement with pinion 40 carried by shaft 41. Said shaft also carries a control member 42 provided with a projection adapted to co-act with the stop lever 43 to prevent operation of the spring motor. A governor, comprising the radial arms 44 carrying blocks 45, is rotated by shaft 41 and as the speed increases said blocks travel outwardly as a result of centrifugal force, eventually engaging the interior surface of the member 46 and the frictional resistance produced acts as a brake slowing down the speed of the shaft. Shaft 35 extends beyond the frame member 28 and carries a pinion 47 which drives a gear 48 meshing with pinion 50. Said pinion is carried by the stud shaft 51 adapted to have interfitting engagement with the take-up spool on which the film is wound, the upper end of said spool being rotatably supported by the projection 52 depending from the knurled wheel 16.

Figure 8:
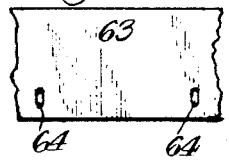
Figure 8 is a view showing a portion of the film adapted to be used in the present camera.

As shown in Figure 4, the front portion 11 of the housing is provided with an aperture plate 53 having an exposure aperture 54 located in alignment with the lens of the camera and also having openings 55 permitting insertion of the supply and take-up spools 56 and 57, respectively, within their receptacle 58. The supply spool 56 is rotatably supported in a vertical position within its receptacle by the projections 60 and 61, the latter being withdrawn by the operator through actuation of the knurled wheel 16 when it is desired to remove the spool from the camera. The sensitized film 63 having perforations 64, Figure 8, is supplied by the spool 56 and is wound up on the take-up spool 57. In passing from one spool to the other the film is drawn across the exposure aperture. The projection 65, Figure 4, is adapted to enter an opening 64 in the film and to also extend through an opening 66 in the resilient member 67. The resilient backing member 68 engages that portion of the film located over the exposure aperture to hold said portion against the apertured plate.

The projection 65 is carried by a plate 70 pivotally secured at 71 to a supporting member 72 and said plate is yieldingly forced in a direction to locate the projection 65 within a perforation in the film by the spring clip 73. A second plate 74 is pivotally supported for movement on the member 72 by the pivot 76 and the pin 79 which passes through a slot 75 limits movement of said plate. The forward end of the plate is formed with a depending portion which in turn carries the stop arm 43 for controlling operation of the spring motor. Extending to the right of the plate 74, Figure 4, is an extension 77 which is curved at its end so as to engage the pin 78. An actuating plate 80 is pivotally secured at 76 and yieldingly biased in a counter-clockwise direction by the spring clip 82. Said actuating plate 80 carries on its upper side the member 83 which is held on said plate by the securing pin 84. Said member is rotatable with respect to its securing pin 84 and is yieldingly held against a stop 85 extending from plate 80 by the spring 86, best shown in Figure 3. An extension 81, forming part of said actuating plate, is adapted to engage the plate 70 and when said engagement takes place the front edge of the actuating plate 80 will contact pin 87 projecting upwardly from plate 74. If movement of plate 80 in a clockwise direction is continued, motion will be imparted to plates 70 and 74. Plate 70 will be rotated on its pivot 71 due to the fact that extension 81 of plate 80 contacts the same, and plate 74 will be rotated with respect to pivot 76 since plate 80 engages pin 87. This clockwise motion of plate 80 takes place against the tension of spring 82 which functions to return the plate to initial position. Spring 73 in a like manner returns plate 70, whereas, plate 74 is biased by spring 90 which also acts on the stop arm 43 integral with or suitably fixed to said plate 74 and which spring thereby maintains said arm in contact with the control member 42.

The depending end 23 of the curved lever 20 is given a translating movement when lever 13 is actuated to trip the shutter of the camera and returned to initial position. Movement in one direction of said lever 13 causes a corresponding movement of the depending arm 23 to take place and said end will therefore move from its full line position, Figure 4, to its dotted line position. In doing so the depending end will strike the rotatable member 83 but as said member is able to rotate in a counter-clockwise direction, said depending end will pass beyond the member. The return of the lever 13 to initial position will cause the depending end 23 to strike member 83 and as rotation is impossible in this direction, the depending end 23 actuates the plate member 80. This actuation of plate member 80 is in a clockwise direction, causing the extension 81 to engage the plate 70 and subsequently causing member 80 to engage the pin 87. Initial movement of the actuating plate 80 will rotate plate 70 sufficiently to withdraw the projection 65 from the perforation in the film and further movement will actuate plate 74 by contact with pin 87 to release the stop arm 43 from engagement with the control member 42 of the spring motor. Thus the projection 65 is first withdrawn to free the film and subsequently the stop member for the motor is withdrawn. Accordingly, shifting of the film will take place to bring an unexposed portion of the film in alignment with the exposure aperture.

Figure 5:
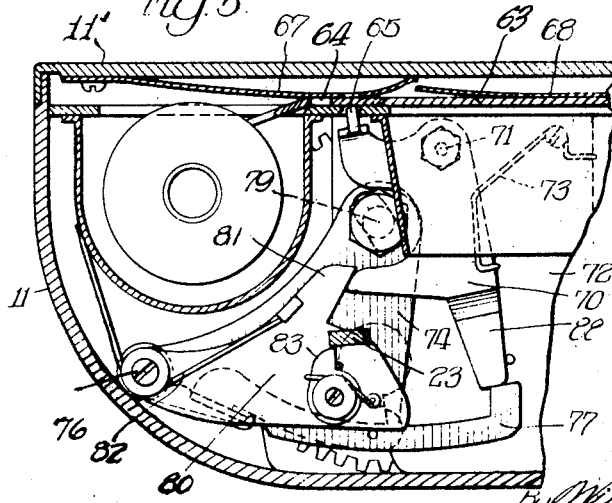
Figure 5 is a fragmentary view similar to Figure 4 but showing the mechanism in released position with the projection withdrawn from an opening in the film.

Figure 5 shows the various parts above described in the position they assume after the stop member has been withdrawn to release the motor. It will be observed that the extension 88, forming part of plate 70, is in contact with portion 77 of plate 74 and therefore as long as the projection 65 remains withdrawn from a perforation of the film the stop lever 43 will be held in released position. However, plate 70 is biased by spring 73 to force projection 65 into contact with the film and as soon as a perforation is aligned therewith the projection will enter the same to stop movement of the film. This return movement of plate 70 will release portion 77 and accordingly said portion and plate 74 will return to initial position. This will return the stop arm 43 to locking position where it will engage with the projection on the control member 42 to stop operation of the spring motor.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a photographic camera, spring motor means operating to wind a sensitized film upon a take-up spool, a plate member having a projection adapted to enter an opening in the film, a second plate member having a stop arm for holding the spring motor against operation, said plate members being normally free and independent of each other, an actuating member associated with both plate members and operative to cause movement of both plate members to withdraw the projection from the film and to also withdraw the stop arm to release the spring motor, said plate members being adapted to directly engage each other as a result of said movement whereby the stop arm is held in released position as long as said projection remains withdrawn from an opening in the film, and means for tripping the shutter of the camera, said shutter tripping means effecting movement of the actuating plate upon its return to initial position.

2. In a photographic camera, spring motor means operating to wind a sensitized film upon a take-up spool, a pivoted plate member having a projection adapted to enter an opening in the film, a second plate member having a stop arm for holding the spring motor against operation, said plate members being normally free and independent of each other, an actuating member associated with both plate members and operative to cause movement of both plate members to withdraw the projection from the film and to also withdraw the stop arm to release the spring motor, said plate members being adapted to directly engage each other as a result of said movement and form a latch to hold the stop arm in released position as long as the projection remains withdrawn from an opening in the film, means yieldingly forcing said first mentioned plate member in a direction to cause said projection to enter an opening in the film, and means for tripping the shutter of the camera, said shutter tripping means effecting movement of the actuating plate upon its return to initial position.

3. In a photographic camera, an upstanding aperture plate, sensitized film in contact with said aperture plate and adapted to have movement with respect thereto, spring motor means operative to cause movement of said film and to wind said film upon a take-up spool, a horizontally disposed pivoted plate having a projection extending through an opening in the aperture plate and adapted to enter an opening in the film, a second horizontally disposed plate member providing an arm for locking the spring motor against operation, an actuating member associated with both plate members and operative to cause movement thereof in sequence to withdraw the projection from the film and thereafter withdraw the locking arm to release the spring motor, said plate members and said actuating member having movement in substantially parallel planes which form a right angle with respect to said aperture plate, and means causing operation of said actuating member following an exposure of said film, whereby the exposed portion is wound on the take-up spool, said projection automatically entering the next opening in the film to arrest the film and simultaneously stop operation of the spring motor means.

LEWIS H. MOOMAW.